Oct. 7, 1947.  J. BERNHARDT  2,428,542
METHOD OF MANUFACTURE OF PITOT-STATIC TUBES
Filed March 17, 1944
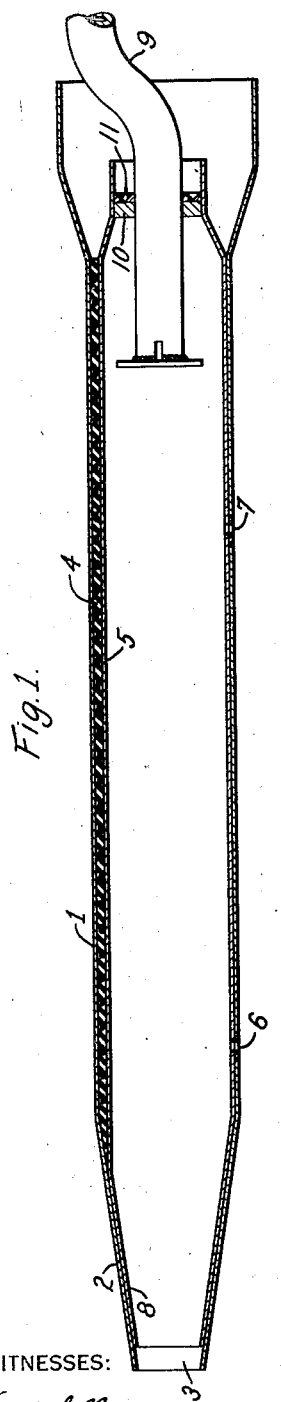
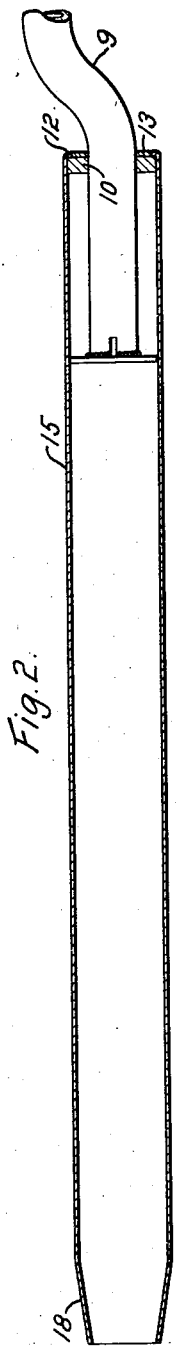
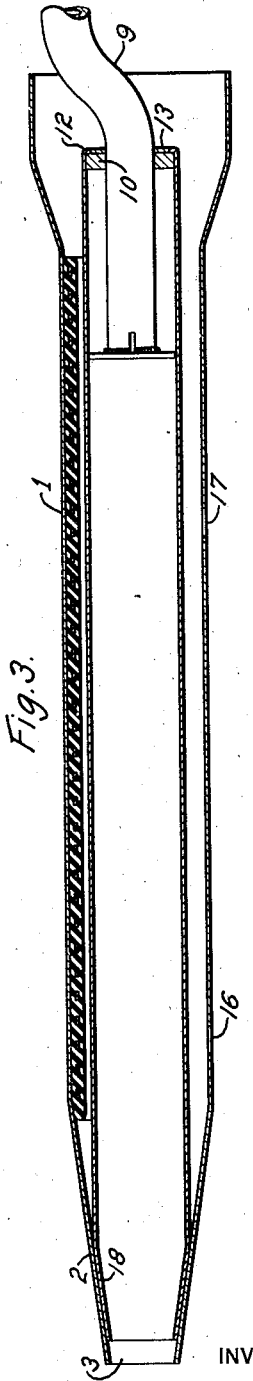
INVENTOR
Jacob Bernhardt.
BY
Paul E. Friedemann
ATTORNEY Patented Oct. 7, 1947

2,428,542

UNITED STATES PATENT OFFICE 2,428,542

METHOD OF MANUFACTURE OF PITOT-STATIC TUBES

Jacob Bernhardt, Mansfield, Ohio, assignor to Westinghouse Electric Corporation, East Pittsburgh, Pa., a corporation of Pennsylvania Application March 17, 1944, Serial No. 526,973

3 Claims. (Cl. 29—148)

My invention relates to a method of assembly of the various elements of a Pitot-static tube. As is well known, Pitot-static tubes are mounted on the outer portion of an aircraft wing, outboard strut, or other location on the aircraft where the tube openings will be exposed to the undisturbed air flow. By means of suitable pipes the tube openings are brought into communication with an instrument designated "air speed indicator" mounted on the instrument panel of the aircraft.

The dynamic pressure is usually communicated to the interior of a hermetically sealed chamber which may take various forms, as the bellows structure of an aneroid barometer. The static tube measuring pressure of the air flow adjacent the pickup tube is lead to a similar bellows structure, usually called a Sylphon bellows, and these two bellows are mechanically coupled in opposite position so that the differential movement thereof is an indication of the air speed. Since the Pitot-static tube must necessarily be located in the undisturbed region of the air flow, it is exposed to all climatic conditions and thus is particularly subject to the low temperatures of certain seasons or usually surrounding an aircraft when flying at high altitudes. This means that if the Pitot-static tube passes through air laden with moisture in the form of fog, snow, rain or otherwise, moisture may collect in the tube and form liquid slugs or ice plugs in the tube. The air speed indicator may thus become entirely useless.

With the modern type of Pitot-static tube, electrical heaters are disposed within the tube and suitable drain holes are disposed in the casing so that the tube, when the heater is energized, remains relatively warm regardless of the temperatures surrounding it, and the air within the tube is robbed of its moisture content so that accurate indication may, nevertheless, take place. With one type of Pitot-static tube, regularly being manufactured and disclosed in detail in the patent of E. Daiber, No. 2,300,654, issued on November 3, 1942, and entitled "Pitot tube," two heating cartridges are mounted within the tube, one in the forward region and one somewhat farther back. These heating cartridges have to be rigidly supported with reference to the outside casing and it has been found extremely difficult to solder or braze these heating cartridges, and the supporting structure for them, to the casing of the Pitot tube.

One object of my invention is to eliminate the difficulties in the assembly of a Pitot-static tube.

Another object of my invention is to braze the elements disposed within a Pitot-static tube to the outside casing from the outside of the tube.

It is also a more specific object of my invention in the assembly of a Pitot-static tube—including, when assembled, an outer tube or casing, an arcuate electric heater disposed within the casing and shaped to lie contiguous to the greater portion of the inner surface of the casing, an inner tube and a pressure collecting conduit extending into one end of the inner tube and in hermetically sealed relation thereto—to first shape a relatively long and flat substantially rectangular electric heating unit to fit into the outer casing to lie contiguous to the inner surface of the outer casing, the dimensions of the heater being so selected as to cover the greater portion of the inner surface of the outer casing; second, hermetically seal the conduit to the inner tube; third, insert the inner tube into the heater and outer casing; fourth, so connect the casing, inner tube and conduit that the inner tube may be hydraulically expanded snugly against heater and outer casing; and fifth, hydraulically expand the inner tube against the heater and outer casing.

Other objects and advantages will become more apparent from the study of the following specification and the drawing accompanying the specification, in which drawing:

Figure 1 is a longitudinal sectional view of a Pitot-static tube constructed substantially in accordance with the teachings of the patent of Kenneth L. Woodman, issued February 20, 1945, No. 2,370,102, entitled "Pitot-static air speed indicators";

Fig. 2 shows certain elements of a Pitot-static tube in one stage of assembly; and Fig. 3 shows a second stage of assembly of a Pitot-static tube.

To better understand my contribution to the art, a brief description of the construction of the Pitot-static tube may be of value. The outer casing 1 is of conventional design, having a forward conical portion 2 spun into the shape shown, and provided with an opening 3 for receiving the dynamic pressure of the air through which the Pitot-static tube is moving.

The casing 1 is preferably made of sheet or extruded brass, copper, or some other metal or alloy having good heat conducting properties and being resistant to corrosion. Since this type of sheet material is easily formed, the tapered end 2 may be formed by spinning.

At the right-hand end, or rear end, the casing 1 fits into a machined cast element of copper or brass (not shown) for connection to the craft with which the Pitot-static tube is to be used, all as described and shown more in detail in the hereinbefore mentioned copending application of Kenneth L. Woodman. The details and arrangement of the elements of the finished Pitot-static per se form no part of my invention.

For a better understanding of my contribution to the art, a general description of the structure will, however, be helpful.

With the construction to which my invention relates a very flat elongated substantially rectangular electric heating unit 4 is sandwiched between the outer casing 1 and the inner tube 5.

After the outer casing 1 is formed into the shape shown in Figs. 1 and 3 I curve the heating unit 4 into a generally cylindrical shape and insert it into the outer casing from the rear or righthand end of the casing. The dimensions of the heater are so chosen that when the heater is in position, it contacts the inner surface of the casing over about 250° to 270°. The heating unit is brought up against and, if desired, somewhat into the long-tapered portion 2. The heater is so positioned that it is disposed symmetrically with reference to a vertical plane through the longitudinal axis of the casing. The longitudinal edges of the heater are thus spaced equal distances from the moisture drain apertures 6 and 7.

The inner tube 5, having a tapered nose 8 shaped to fit the tapered nose 2 is then inserted into the heater and outer casing and the tapered noses 2 and 8 are brazed into a solid structure.

With the method of assembly of the prior art, the inner tube 5, having the dimensions and shape of tube 15 of Fig. 2, but without any of the other elements shown in Fig. 2, is inserted into the heater and casing 1 and then a rubber, or similarly pliable plunger, is inserted from the rear. By subjecting the plunger to pressure or impacts or both, the inner tube is expanded to snugly sandwich the heater between the casing 1 and tube 5. The tube 5 is then shaped at the rear as shown in Fig. 1 and the pressure transmitting tube 9 is then inserted as shown in Fig. 1. Thereafter, the washer 10, the pressure transmitting tube 9 and inner tube 5 are brazed to each other at 11. This brazing procedure has been rather difficult, time consuming and expensive. Furthermore, rejects are frequent. The reason for the difficulties arises from the fact that after the tube 5 has been expanded it has to be shaped at the rear and then the brazing has to be made within the narrow confines at the rear of the casing 1 and the tube 5.

I propose to insert the pressure transmitting tube 9 into the rear of inner tube 15, which I select of material considerably more pliable than tube 9, and then peen the rear end over at 12, against the washer, or collar 10 already firmly positioned on tube 9. I then solder, or braze, tube 9 and collar 10 to the inner tube 15 as shown at 13. The inner tube and tube 9 are thus one unitary structure as shown in Fig. 2.

This unitary structure of tubes 9 and 15 I insert into the heater and casing as shown in Fig. 3. While in position as shown in Fig. 3, the noses 2 and 18 are brazed into a unitary structure. When this firm connection has been made, I plug the opening 3 and through tube 9 subject the inner tube to hydraulic expanding pressure. The inner tube expands against the mica insulation of the heater firmly positioning the heater in the casing. The hydraulic pressure also causes the inner tube to expand down into the elongated relatively narrow slots 16 and 17 to form an elongated trough in the inner tube.

Small drain holes, like 6 and 7, are then drilled into the inner tube at the bottom of the troughs formed in the slots 16 and 17 to provide effective drainage of any moisture that may collect in the inner tube 15.

With my method of manufacture and assembly the steps are simpler and easier and there is much greater assurance that a good brazed joint is obtained.

While I have disclosed but one simple sequence of steps, I do not wish to be limited to the particular disclosure made but wish to be limited only by the scope of the claims hereto appended.

I claim as my invention:

1. In the manufacture of a Pitot tube including an outer casing, a flat electric heater disposed within the casing to fit against the inner surface thereof, an inner tube disposed within the heater and casing snugly sandwiching the heater between the casing and inner tube, and a pressure transmitting tube connected to the rear of the inner tube, the steps of shaping the outer casing into tubular form, curving an elongated substantially rectangular thin heater into a split sleeve and inserting the heater into the casing, shaping the inner tube to fit into the split sleeve of the heater, hermetically brazing the pressure transmitting tube to the aft end of the inner tube, inserting the front end of the inner tube into the heater and casing so that the front end of the inner tube is contiguous to the inner surface of the front end of the casing, hermetically securing the front end of the inner tube at the contiguous region to the front end of the casing, temporarily plugging the front end of the casing and inner tube, subjecting the inner tube to internal fluid pressure through the pressure transmitting tube to expand the inner tube against the heater and casing to snugly sandwich the heater between the casing and inner tube.

2. In the manufacture of a Pitot tube including an outer casing, a flat electric heater disposed within the casing to fit against the inner surface thereof, an inner tube disposed within the heater and casing snugly sandwiching the heater between the casing and inner tube, and a pressure transmitting tube connected to the rear of the inner tube, the steps of shaping the outer casing into tubular form with a conical nose, curving an elongated substantially rectangular thin heater into a split sleeve and inserting the heater into the casing, shaping the inner tube with a nose to fit the inner surface of the nose of the casing, hermetically brazing the pressure transmitting tube to the inner tube, inserting the inner tube into the heater and casing so that the nose of the inner tube fits against the inner surface of the nose of the casing, brazing the nose of the inner tube to the nose of the casing, temporarily plugging the front opening of the casing, subjecting the inner tube to internal hydraulic pressure through the pressure transmitting tube to expand it against the heater, and also against the casing at the region of the casing not covered by the heater, to snugly sandwich the heater between the casing and inner tube.

3. In the manufacture of a Pitot tube having an elongated generally cylindrically shaped casing, a flat elongated electric heater disposed within the casing to fit against the inner surface thereof, an inner tube disposed within the heater and snugly sandwiching the heater between the casing and inner tube, and a pressure transmitting tube connected to the rear of the inner tube, the steps of inserting the heater in the casing, hermetically connecting the pressure transmitting tube to the rear end of the inner tube, inserting the forward end of the inner tube into the casing so that the heater is disposed between the outer surface of the inner tube and the inner surface of the casing and that the forward ends of the casing and inner tube are adjacent each other, hermetically connecting the adjacent forward ends of the casing and inner tube, temporarily plugging the forward end of the connected inner tube and casing, and subjecting the inner tube to internal pressure through the pressure transmitting tube to snugly sandwich the heater between the casing and inner tube.

JACOB BERNHARDT.

REFERENCES CITED

The following references are of record in the file of this patent:

UNITED STATES PATENTS

| Number | Name | Date |
|---|---|---|
| Re. 4,888 | Chaffee | May 7, 1872 |
| 79,220 | Forsyth | June 23, 1868 |
| 1,725,286 | Loughead | Aug. 20, 1929 |
| 1,461,130 | Loughead | July 10, 1923 |
| 2,093,092 | McElhany et al. | Sep. 14, 1937 |
| 895,412 | Badger | Aug. 11, 1908 |
| 942,184 | Persons | Dec. 7, 1909 |